Patented Dec. 18, 1923.

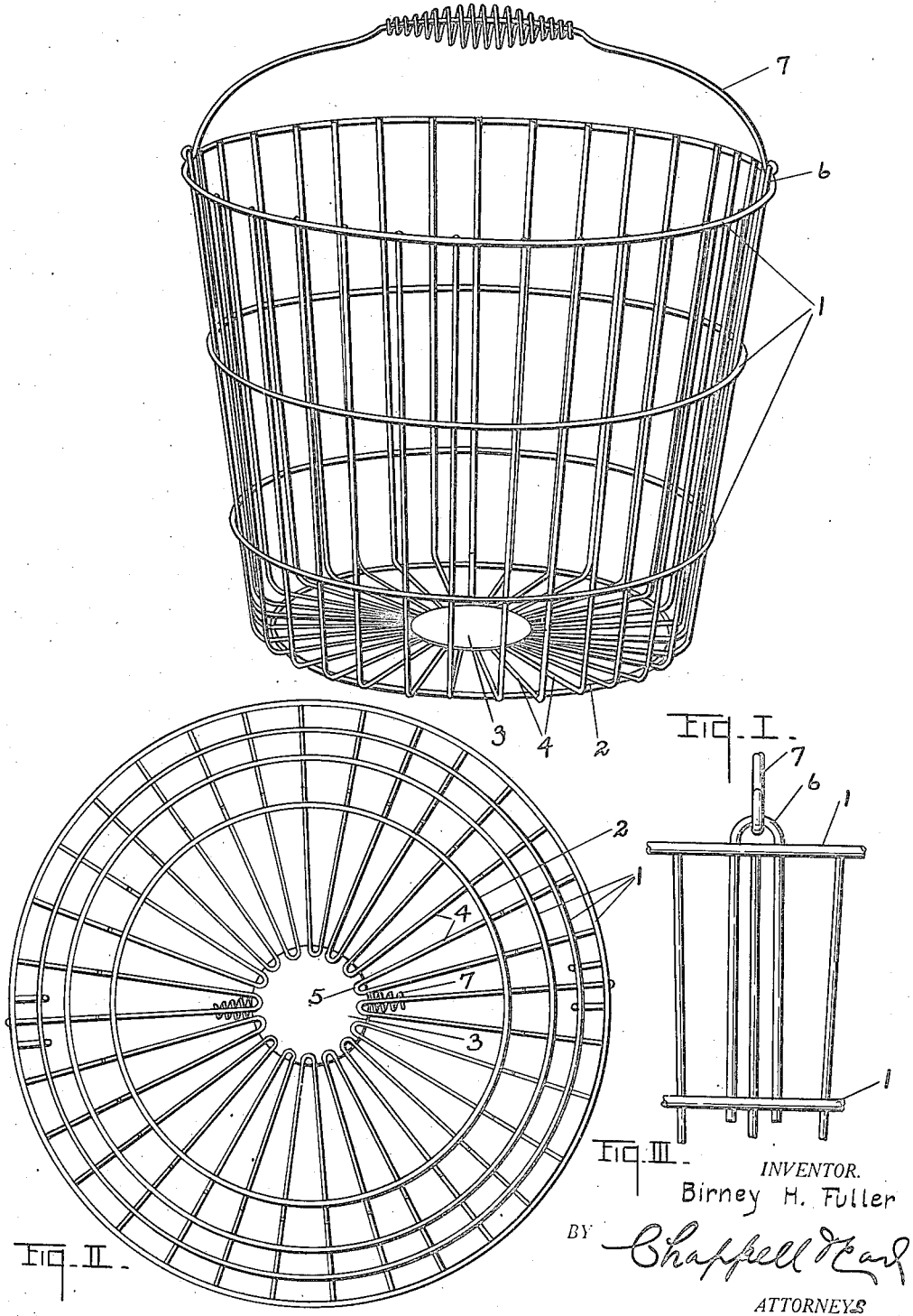

1,477,700

UNITED STATES PATENT OFFICE.

BIRNEY H. FULLER, OF LOS ANGELES, CALIFORNIA, ASSIGNOR TO UNITED STEEL AND WIRE CO., OF BATTLE CREEK, MICHIGAN.

WIRE BASKET OR RECEPTACLE.

Application filed February 14, 1922. Serial No. 536,461.

*To all whom it may concern:*

Be it known that I, BIRNEY H. FULLER, a citizen of the United States, residing at the city and county of Los Angeles, State of California, have invented certain new and useful Improvements in Wire Baskets or Receptacles, of which the following is a specification.

This invention relates to improvements in wire baskets or receptacles.

The main object of the invention is to provide an improved wire receptacle for use in picking and displaying fruits, vegetables and produce which is strong and durable, being capable of withstanding severe usage and at the same time is open at the sides and bottom for the escape of dirt and for ventilation and also to display the produce when used for display purposes.

Further objects, and objects relating to structural details, will definitely appear from the detailed description to follow I accomplish the objects of my invention by the devices and means described in the following specification. The invention is clearly defined and pointed out in the claims.

A structure which is a preferred embodiment of my invention is clearly illustrated in the accompanying drawing, forming a part of this application, in which:

Fig. I is a perspective view of my improved basket or receptacle.

Fig. II is an inverted view thereof.

Fig. III is a detail side elevation showing the means for securing the handle.

In the drawing similar reference characters refer to similar parts throughout the several views.

Referring to the drawing, my improved basket comprises a plurality of wire side hoops 1, bottom hoop 2, and a bottom center disk 3, the center disk being of metal.

The angled integral side and bottom slat members 4 are each formed of a piece of wire folded upon itself with its arms diverging, the loop ends constituting the bottom of the receptacle. The bights 5 of the slat members are welded on the under side of the bottom center disk 3, preferably by electric welds, as by spot welding machine. The bottom hoop 2 is welded on the under side of the bottom portions of these slats adjacent the angles thereof, while the side hoops 1 are arranged on the outer sides of the upright portions of the slat members and welded thereto with the top hoop at the upper ends thereof.

The attaching ears 6 for the handle 7 are formed of loops of wire welded to the inner side of the top hoop and the intermediate side hoop with the loops projecting above to receive the handle, as illustrated.

With the parts thus formed and arranged I secure a basket or receptacle which is for the harvesting or displaying or handling of fruits and vegetables which, when used for gathering vegetables, allows the dirt to escape freely, and the fruit or vegetables are effectively displayed when the receptacle is used for that purpose. The receptacles are comparatively light in weight, but are very strong and durable and capable of withstanding very severe handling without material injury thereto.

Having thus described my invention, what I claim as new and desire to secure by Letters Patent, is:

1. A wire receptacle comprising a plurality of wire side hoops, a wire bottom hoop, a metal bottom center disk, angled integral side and bottom slat members formed of folded pieces of wire welded to said hoops and center disk, said hoops being arranged on the outer side of said slat members with the bight portions of the members on the under side of the bottom disk and the bottom hoop disposed adjacent the angles of the members and the top hoop at the upper ends of said members, and handle loops disposed on the inner side of the top and intermediate hoops and welded thereto with the bight ends of the loops projecting above the top hoop to receive a handle.

2. A wire receptacle comprising a plurality of wire side hoops, a wire bottom hoop, a metal bottom disk, and angled integral side and bottom slat members formed of folded pieces of wire welded to said hoops and center disk, said hoops being arranged on the outer side of said slat members with the bight portions of the members on the under side of the bottom disk and the bottom hoop disposed adjacent the angles of the members and the top hoop at the upper ends of said members.

3. A wire receptacle comprising a plurality of side hoops, a bottom hoop, a bottom center disk, and angled integral side and bottom slat members each formed of a piece of wire folded upon itself with its arms diverging, the bight portions of said members being welded to the said bottom disk, the bottom hoop being welded to the horizontal portions of said members adjacent the angles thereof, the upright portions thereof being welded to the side hoops with the top hoop at the upper ends of said slat members.

In witness whereof I have hereunto set my hand and seal.

BIRNEY H. FULLER. [L. S.]